Dec. 8, 1959 P. WIDMER 2,916,176
TELESCOPIC STAY FOR AUTOMOTIVE VEHICLE LIFT GATE AND THE LIKE
Filed April 30, 1958 4 Sheets-Sheet 1

INVENTOR.
Paul Widmer
BY
J. C. Thorpe
ATTORNEY

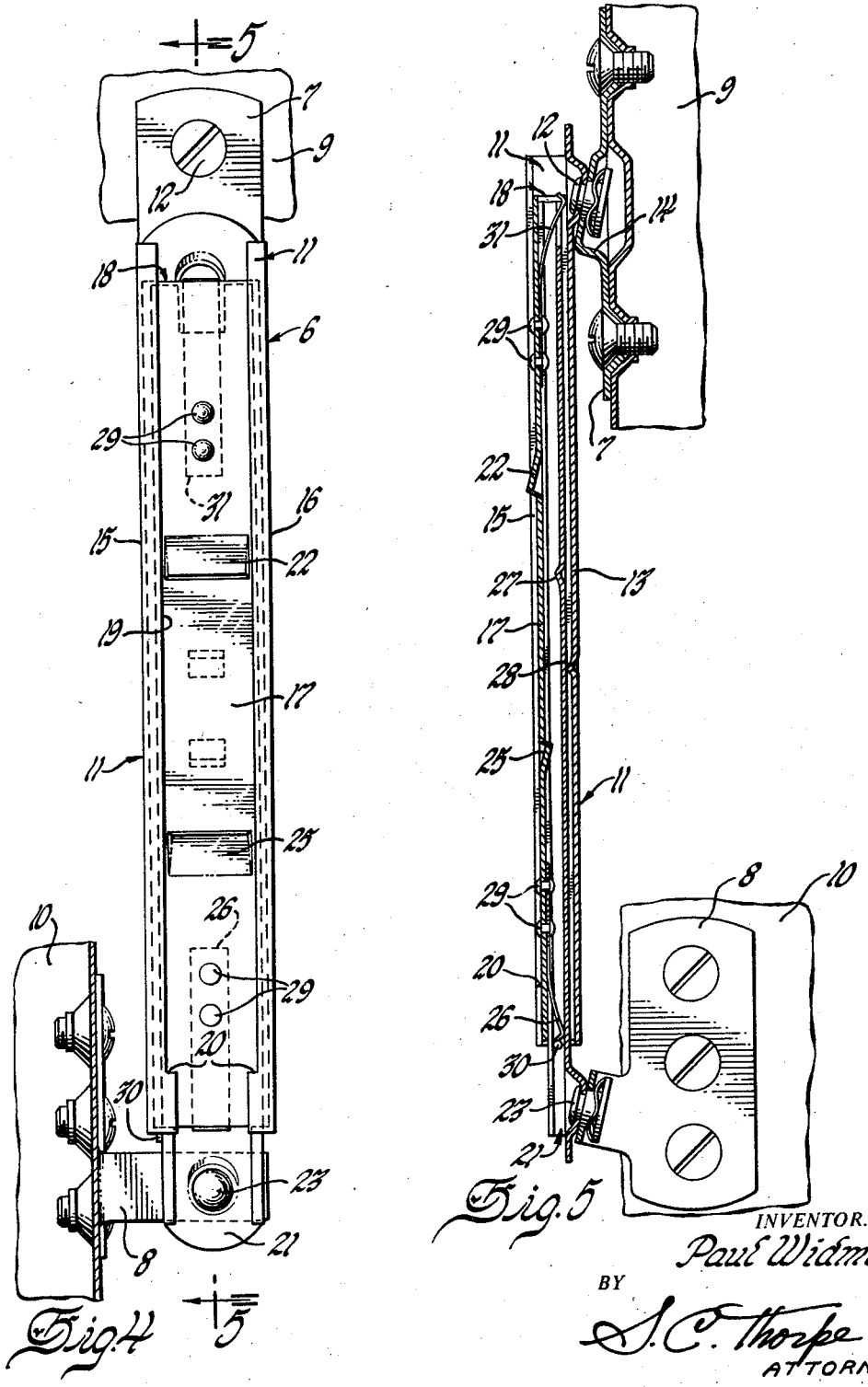

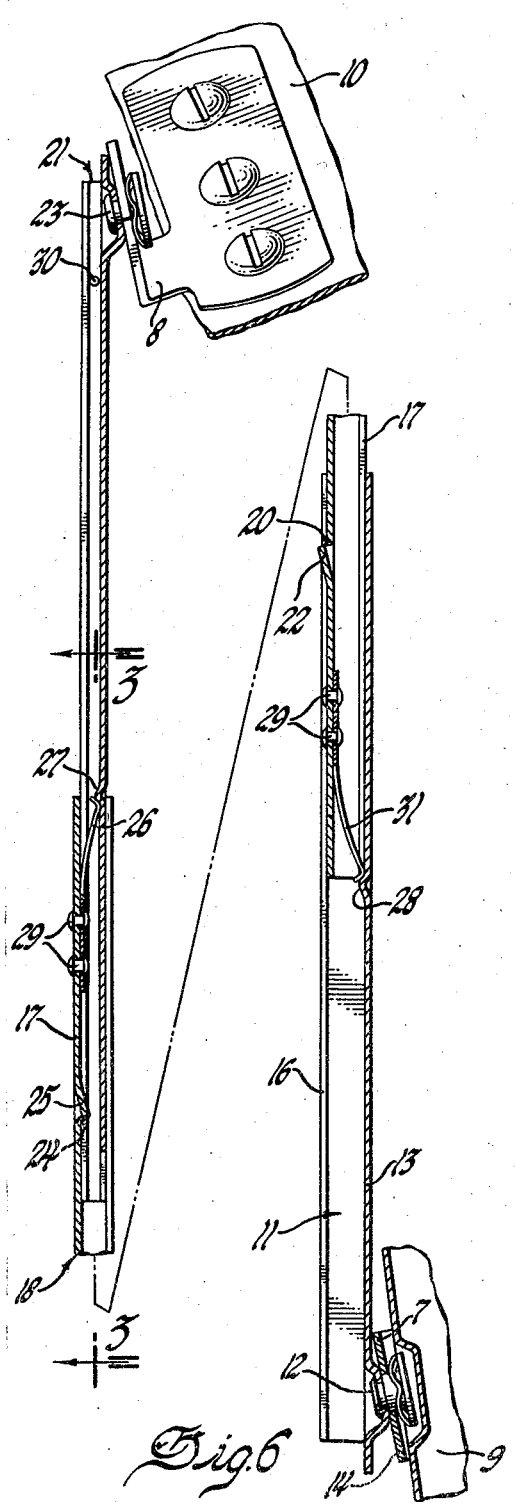

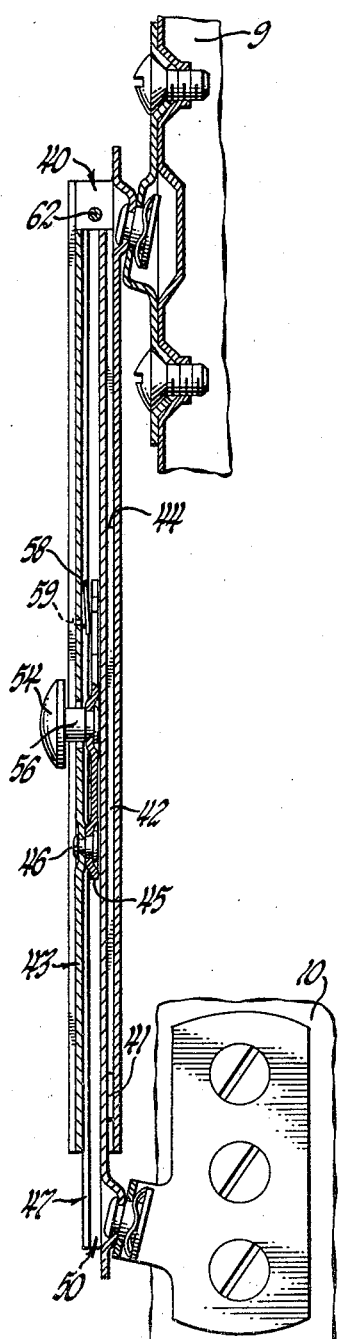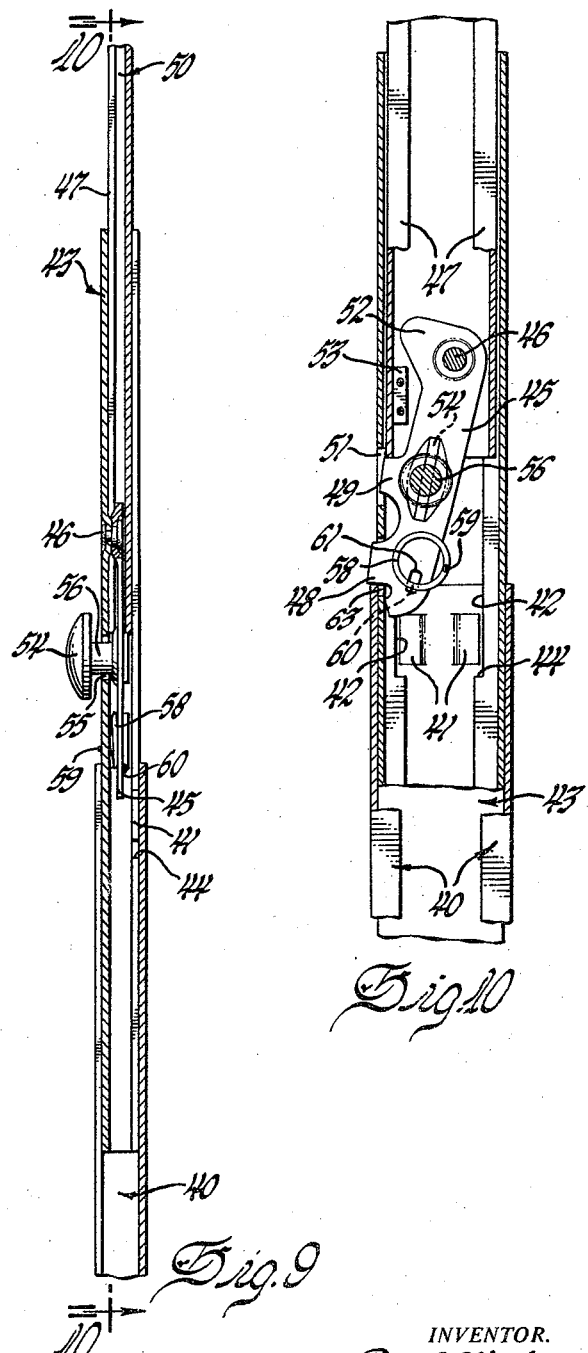

United States Patent Office 2,916,176
Patented Dec. 8, 1959

2,916,176

TELESCOPIC STAY FOR AUTOMOTIVE VEHICLE LIFT GATE AND THE LIKE

Paul Widmer, Detroit, Mich., assignor to General Motors Corporation, Detroit, Mich., a corporation of Delaware Application April 30, 1958, Serial No. 732,020

3 Claims. (Cl. 217—60)

This invention relates to telescopically contractible stays such as are employed for supporting lift gates in open position on station wagons, trucks and other automotive vehicles, however, it is equally applicable to supporting any pivotally raisable window or door.

The improved stay has the particular advantages of comprising three mutually telescopic links for greater compactness in its nonoperative position, the inner and outer links being provided with novel stop means engageable by the intermediate link for limiting maximum extension of the stay, and the inner link having novel latching means associated with and carried thereby for releasably engaging the respective other links in the extended position of the stay so as to hold the lift gate in open position.

Two preferred forms of the improved stay have been selected for purposes of illustrating the invention which will be more clearly understood from the following description, having reference to the drawings wherein:

Figure 4 is an elevational side view of the stay in collapsed or contracted condition as seen from the line 4—4 of Figure 2.

Figure 5 is a longitudinal sectional view of the stay in collapsed or contracted condition, taken substantially along the line 5—5 of Figure 4.

Figure 6 is a sectional view similar to Figure 5, except showing the stay in its extended condition.

Figure 7 is a view similar to Figure 4 but showing a modification of the invention.

Figure 8 is a sectional view taken substantially along the line 8—8 of Figure 7.

Figure 9 is a view similar to Figure 8, but showing the parts in extended relation.

Figure 10 is a view partly in elevation and partly in section along the line 10—10 of Figure 9.

Figure 1:
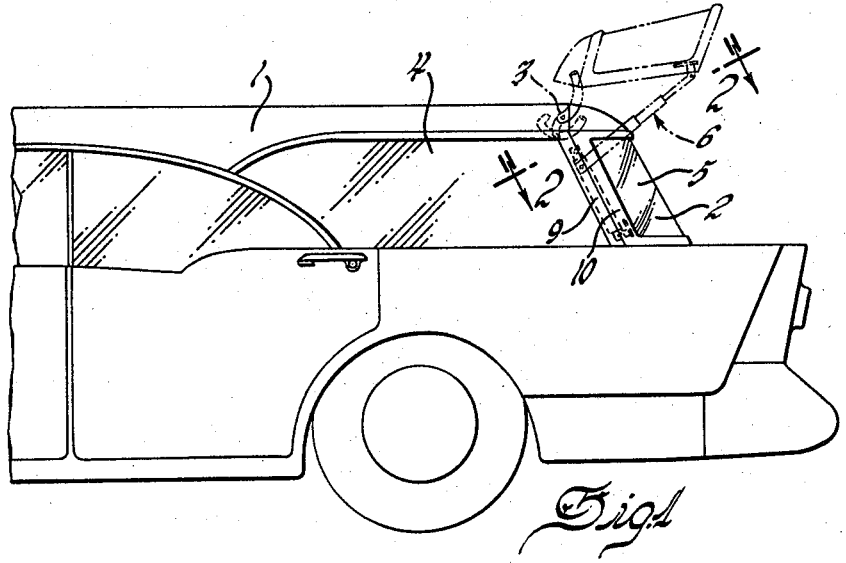
Figure 1 is an elevational side view of the rear end of an automotive vehicle of the so-called "station wagon" type, illustrating application of the invention for releasably supporting the lift gate.
Figures 2, 3:
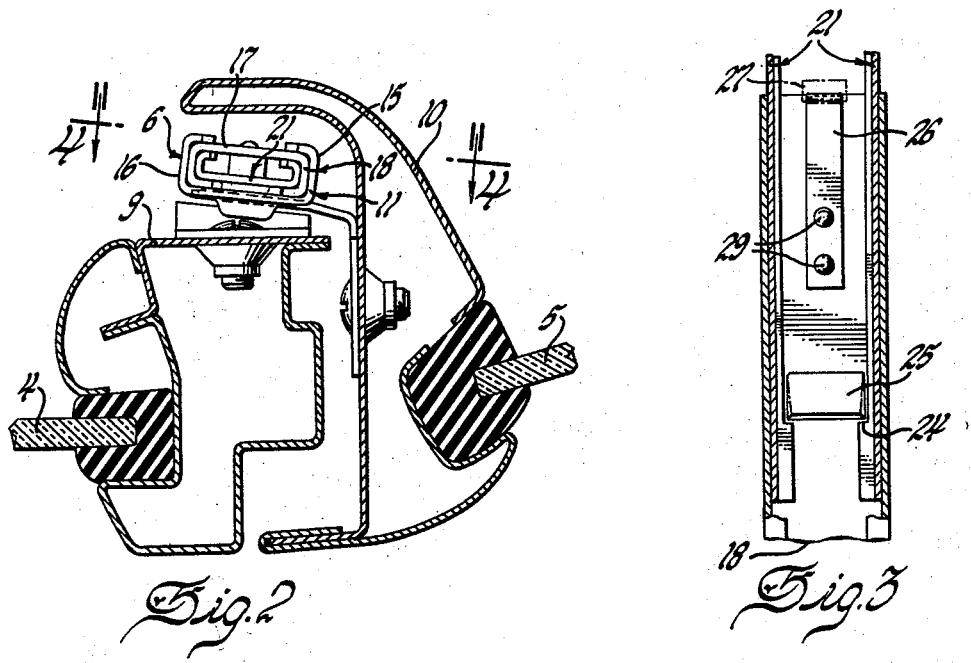
Figure 2 is an enlarged sectional view taken substantially along the line 2—2 of Figure 1, showing the means of mounting the stay to the body and lift gate side frame members.
Figure 3 is a fragmentary sectional view of the stay, taken substantially on the line 3—3 of Figure 6.

Referring now in detail to the drawings, and first to Figures 1 and 2, an automotive station wagon vehicle 1 is shown having a rear lift gate 2 which is swingable about the hinge means 3 from its closed position shown in solid lines to its open position shown in broken outline. 4 indicates one of the side windows of the vehicle body, and 5 indicates the usual back window in the lift gate 2. The lift gate is supported in its open position by a telescopic stay designated generally by the numeral 6, the opposite ends of which are pivotally connected to upper and lower brackets 7 and 8 which are respectively fixed to the body side window frame 9 and the lift gate window frame 10.

As best shown in Figures 2–6, the stay comprises three telescopically interfitting links, each of generally channel shape section. Of these, the outer link 11 has a pivotal connection formed by a pin 12 connecting its channel web 13 to the body mounted bracket 14, and the side walls 15 and 16 of its channel are flanged inwardly toward each other around the web 17 of the intermediate link 18. These flanged side walls define a slot 19 whose width is reduced at the lower end of the channel by extensions of the flanges to form a stop shoulder 20 (see Figures 4 and 6).

The intermediate link 18 has its channel section in oppositely presenting relation to that of the outer link 11 and has its side walls similarly flanged inwardly around the web of the inner link 21. The channel web of the intermediate link is provided with an embossment or struck out portion 22 which may travel freely within the outer link slot 19 but is engageable with the stop shoulder 20 to limit extension of the intermediate link relative to the outer link.

Similarly as in the case of the outer link, the inner link 21 has its side walls flanged inwardly to form a slot, and the channel web of this inner link is pivoted by a rivet 23 to the lift gate attaching bracket 8. As shown in Figure 3, the inward flanging of the side walls of this inner link is extended at its opposite end to form a stop shoulder 24 for an inward embossment 25 in the channel web of the intermediate member which serves to limit relative extension of the inner and intermediate links.

Latch means for releasably maintaining the stay in extended relation is carried by the intermediate link, and in this form of the invention the latch means comprises two cantilever leaf springs 26 and 31 secured to the channel web of the intermediate member and projecting therefrom into slidable engagement respectively with the channel webs of the inner and outer links. To provide a detent action, the channel webs of the inner and outer members are provided with detent means in the form of inward embossments 27 and 28, respectively, over which the free ends of the latch springs 26, 31 are adapted to frictionally override when sufficient force is applied endwise of the stay during opening and closing of the lift gate. Rivets 29 are shown as the means of securing the fixed ends of the cantilever springs to the intermediate channel web, although other means may, of course, be substituted for the purpose. In addition, a rivet 30 is preferably located in one lower side wall of the inner link channel with its head projecting outwardly thereof for engagement with the corresponding end of the intermediate link. This rivet 30 serves to limit relative contraction of the inner and intermediate links during telescopic shortening of the stay pending relative contraction of the intermediate and outer links when the lift gate is lowered to closed position.

The form of stay thus far described relies on frictional detent action to maintain it in extended relation, this being satisfactory in all applications where excessive lift gate weight does not require a positive latching arrangement. The cantilever latching springs have the additional advantage of serving as anti-rattle means between the telescoping links, and in combination with the simple embossments and stop shoulders described results in a very compact, inexpensive and yet rugged stay for the purpose.

In the modification shown in Figures 7–10 three slidably telescopic channel section links are again employed, the channel section of the intermediate link being in oppositely presenting relation to those of the inner and outer links as in the previously described embodiment. In this instance the channel web of the outer link 40 is provided with embossments 41 (Figure 10) adjacent its free end, these embossments projecting between the inwardly flanged side walls 42 of the intermediate link 43 which form a slot therefor. Adjacent one end of the intermediate link 43 its side wall flanges are extended to form a stop shoulder 44 for engagement by these embossments 41 to limit relative extension of the intermediate and outer links. The latching means in this modified stay is of the positive engagement type and comprises an arm 45 disposed longitudinally within the channel section of the inner link 50 and pivoted at one end to the web of the intermediate link 43 by a pin 46 extending between the flanged side walls 47 of the inner link. This latch arm is thus swingable within the inner link, and when the inner and intermediate links are in extended relation (Figures 9 and 10) the opposite end of the latch arm extends out the free end of the inner link for swinging movement between the channel side walls of the intermediate link. Two spaced latching projections 48, 49 on the side of the arm are provided for latchably engaging (Figure 10) the free ends of the outer and inner links, respectively, when these links are both in extended relation to the intermediate link. Thus in this embodiment these free ends of the inner and outer links constitute the keeper means with which the latch is engageable to prevent contraction of the stay. To permit swinging movement of the arm into such latching engagement, the adjacent channel side wall of the intermediate link is provided with corresponding openings 63 and 51 which accommodate passage of the arm projections 48, 49. In order to automatically effect such swinging movement of the arm to its latching position when the stay is extended, as well as to limit relative extension of the inner and intermediate links, the pivoted end of the arm has a cam lobe portion 52, and a stop member in the form of a lug 53 is fixed to the adjacent channel side wall of the inner member. This stop lug 53, it will be noted in Figure 10, is positioned a short distance from the free end of the inner link so that the cam and lobe will coact with each other as aforesaid, but neither will interfere with telescopic contraction of the inner and intermediate links during closing of the lift gate.

The latch arm 45 is manually swingable from its latched position by means of a handle 54 connected thereto by a shank portion 56 extending through an elongated transverse slot 55 in the channel web of the intermediate link. This shank portion 56 is sufficiently small in diameter to pass between the flanged side walls 47 of the outer member when the stay is collapsed (Figures 7 and 8). Serving to alternatively bias the latching arm in either its latched or unlatched positions is a coil spring 58 having its opposite ends 59, 60 pivotally engaging respectively the intermediate link channel web and the arm. The pivotal connection of the spring to the arm is effected by extending its end 60 of the spring through an elongated slot 61 in the arm. As will be evident from comparison of the spring and latch arm positions in Figures 7 and 10, an "over-center" biasing action is imposed on the spring during shifting of the arm from one extreme position to the other, whereby positive control of the latching is afforded. As in the previously described embodiment, the inner link is provided at its pivotally connected end with a rivet 30 projecting outwardly from one of its channel side walls for engagement with the corresponding end of the intermediate link during collapsing of the stay. If desired, the outer link is provided with a cross pin 62 extending between its channel side walls adjacent the pivoted end for the similar purpose of engaging the corresponding end of the intermediate link to limit their relative contraction.

While only two preferred embodiments of the invention have been disclosed, it is appreciated that numerous minor changes in the construction and arrangement of the parts may be made without departing from the spirit and scope of the invention as hereinafter claimed.

I claim:

1. In a contractible stay, the combination of three longitudinally telescopic links, the remote ends of the inner and outer of said links having means adapted for pivotally connecting the stay to two relatively movable elements to be supported from each other, each of said links being of channel section, the channel of the intermediate link being in oppositely presenting relation to the channels of the inner and outer links, the channel side walls of the intermediate link being flanged inwardly adjacent one end thereof forming a stop, the channel web of the outer link having a member adjacent one end thereof projecting into abuttable engagement with said stop for limiting telescopic extension of said outer and intermediate links, and a combined latch and stop means carried by the intermediate link and mounted within its channel, said means comprising an arm one end of which is swingable into and out of latching engagement between the adjacent ends of the inner and outer links to prevent their contraction when fully extended, said arm having a cam lobe portion for limiting telescopic extension of the inner and intermediate links, and means on the inner link engageable with said cam lobe portion to effect swinging of said arm end into said latching engagement in response to fully extending the stay.

2. In a contractible stay, the combination of three longitudinally telescopic links, the remote ends of the inner and outer of said links having means adapted for pivotally connecting the stay to two relatively movable elements to be supported from each other, each of said links being of channel section, the channel of the intermediate link being in oppositely presenting relation to the channels of the inner and outer links, the channel side walls of the intermediate link being flanged inwardly adjacent one end thereof forming a stop, the channel web of the outer link having a member adjacent one end thereof projecting into abuttable engagement with said stop for limiting telescopic extension of said outer and intermediate links, and a combined latch and stop means carried by the intermediate link and mounted within its channel, said means comprising an arm pivoted at one end to the channel web of the intermediate link for swinging movement between its channel side walls, said pivoted end of the arm having a cam lobe extending toward one channel side wall of the intermediate member, the other end of said arm having latch portions extending toward said one channel side wall, said one channel side wall being apertured to accommodate passage therethrough of one of said latch portions into latching engagement with said one end of the outer link when the outer and intermediate links are extended to their limiting positions, the inner link having a stop member engageable with said cam lobe to limit telescopic extension of said inner and intermediate links and to swing the arm into said latching engagement, the other of said latch portions having latching engagement with the inner link on the opposite side of the stop member from said cam lobe when said one latch portion is engaged with the outer link.

3. The invention of claim 2, together with a spring connecting the arm to the channel web of the intermediate link and biasing the arm pivotally of its said one end, the spring connection to the web being mediate the respective locations of the spring connection to the arm corresponding to the limits of pivotal movements of the arm whereby the biasing effect of the spring is reversed when the arm is swung through its mediate position.

References Cited in the file of this patent

UNITED STATES PATENTS

| 1,006,427 | Boraks | Oct. 17, 1911 |
| 1,311,918 | Seagers et al. | Aug. 5, 1919 |
| 1,539,856 | Martin | June 2, 1925 |
| 2,620,210 | Wuster | Dec. 2, 1952 |
| 2,666,606 | Steen | Jan. 19, 1954 |

FOREIGN PATENTS

| 57,353 | Germany | July 2, 1891 |